United States Patent [19]

Ramekers et al.

[11] Patent Number: 5,155,598
[45] Date of Patent: Oct. 13, 1992

[54] METHOD AND APPARATUS FOR PROCESSING AND REPRODUCING IMAGES

[75] Inventors: Reinier J. Ramekers, Oostrum; Romeo M. Van Strijp; Ronald Castermans, both of Venlo, all of Netherlands

[73] Assignee: Oce-Nederland B.V., Venlo, Netherlands

[21] Appl. No.: 440,981

[22] Filed: Nov. 22, 1989

[30] Foreign Application Priority Data

Nov. 24, 1988 [NL] Netherlands ............ 8802893
Oct. 26, 1989 [NL] Netherlands ............ 8902654

[51] Int. Cl.⁵ .................................. H04N 1/23
[52] U.S. Cl. ............................. 358/298; 358/459
[58] Field of Search .................... 346/107 R, 108; 358/296, 298, 454, 455, 459, 456, 458, 465, 466, 300; 400/120

[56] References Cited

U.S. PATENT DOCUMENTS

| | | | |
|---|---|---|---|
| 3,725,574 | 2/1972 | Gast | 358/298 |
| 3,977,007 | 8/1976 | Berry et al. | 358/298 |
| 4,084,183 | 4/1978 | Keller et al. | 358/298 |
| 4,084,259 | 4/1978 | Cahill et al. | 364/900 |
| 4,110,795 | 8/1978 | Spencer | 358/429 |
| 4,504,115 | 3/1985 | Ogawa et al. | 358/261.1 |
| 4,654,721 | 3/1987 | Goertzel et al. | 358/459 |
| 4,700,235 | 10/1987 | Gall | 358/298 |
| 4,884,080 | 2/1989 | Hirahara et al. | 358/298 |
| 4,890,121 | 12/1989 | Hirahara et al. | 358/298 |

FOREIGN PATENT DOCUMENTS 0190901 8/1986 European Pat. Off. .
0201674 11/1986 European Pat. Off. .

OTHER PUBLICATIONS

IBM Journal of Research & Development vol. 26 No. 6 Nov. 1982, N.Y. pp. 687-697 "Digital Halftoning of Images".
RCA Review vol. 31, No. 3 (Sep. 1970) pp. 517-533 "Electronically Dithered Half-Tone Pictures".

Primary Examiner—Benjamin R. Fuller
Assistant Examiner—Scott A. Rogers
Attorney, Agent, or Firm—Reed Smith Shaw & McClay

[57] ABSTRACT

Image information relating to an image is printed in a laser printer by forming image elements according to a raster pattern of image points and printing dots in a fixed number N of the image points within each image element, N being smaller than the number of image points in an image element. The image points wherein a dot is to be printed are arranged into a cluster with a minimal perimeter. The dots printed within an image element are all printed with the same intensity and thus have the same diameter, and may overlap contiguous image points in order to fill up the total area of the image element. In an embodiment the position of the cluster within each image element is selected according to the image information.

21 Claims, 9 Drawing Sheets

METHOD AND APPARATUS FOR PROCESSING AND REPRODUCING IMAGES

FIELD OF THE INVENTION

The invention relates to a method and apparatus for reproducing an image and, in particular, to a method and apparatus for processing and reproducing image information relating to an image wherein the image to be reproduced is divided into contiguous image elements each having a raster pattern of image points and selecting a number of image points of each element for printing dots of variable size therein.

BACKGROUND OF THE INVENTION

Various methods have been proposed for printing half-tone images. The following are background examples: U.S. Pat. No. 4,084,259, EP-A-126 782 and EP-A-201 674. See also, U.S. Pat. No. 3,197,558 and RCA Review, Vol. 31, No. 3 (9/70) pp. 517–533 (Electronically Dithered Half-Tone Pictures). Improvements in reproduction in raster form have been developed which substantially enhance half-tone image quality. Generally, such a system utilizes image elements according to a raster pattern of image points. Dots are printed in the image points of each element with intensities based upon intensity data contained in the image information.

An improved method is described in EP-A-190 901 in which the optical density scale of the reproduction system is divided into a number of zones. Each zone is allocated a pattern of N contiguous image points on a raster pattern of m × n image points, where N < (m × n). For each zone, a different number N is selected. During the actual printing, dots (that is black spots) are printed on the image support in the N image points only. A number of intensity levels within a zone are attained for each pattern of image points by allocating different distributions of intensity values to the N image points of the pattern. The dimensions of the dots printed in the image points vary with the intensity value allocated to each image point; that is, the dimensions increase with increasing intensity value to provide a print having a darker appearance. For high intensity values, the printed dots increase beyond the raster boundaries of their image points and partially overlap adjacent image points. In this way each combination of pattern and distribution of intensity values corresponds to a value in the optical density scale. This combination is stored in a memory of a raster pattern generator.

On the basis of the intensity data fixed in the image information the raster pattern generator calls up from its memory the corresponding data concerning the pattern of image points wherein a dot is to be printed and the intensity values applicable per image point and transmits these data to the control unit of a printer in order to provide the image reproduction.

In this method, care is taken to select patterns of image points wherein a dot is to be printed, that take the form of clusters having a large perimeter to obtain a wide dynamic range of gradation. Preferably, the patterns are L-shaped clusters or combinations thereof.

When the known method is used in electrographic laser printers problems arise when the photoconduction properties of the intermediate image support change over time and become uneven over one print area. In laser printers a photoconductive intermediate image support is evenly charged and exposed to a laser beam modulated in accordance with the image information. The image is developed with toner powder using a bias voltage to deposit toner powder onto the exposed areas. The laser beam normally has a more or less circular cross-section and the intensity distribution over the diameter of the beam generally has a Gaussian form; however, in the center of the laser beam, the light intensity may be enough to fully discharge the intermediate image support. Surrounding the center of the beam is an area of lower energy which only partially discharges the intermediate image support. In this lower energy area, system irregularities become apparent which tend to seriously decrease the overall print quality.

Accordingly, it is an object of the present invention to provide a method and apparatus which deliver prints with a consistent image quality.

SUMMARY OF THE INVENTION

In general, the present invention provides a method and apparatus for processing and reproducing on an image support in raster form image information relating to a half-tone image. The method comprises forming image elements in accordance with raster pattern of image points. A fixed number of these image points of each element is selected as print positions for dots on the image support. The selected image points are selected in such a way, that they form a cluster having a minimal perimeter.

In such case, the dots printed with increasing intensity will quickly overlap each other. The effect is to eliminate the system dependencies of the overlapped portions of the low light energy areas. In this way the fraction of the printed area that suffers from system irregularities is minimized.

This effect is further enhanced by printing the dots printed within an image element with a uniform intensity value. If all dots printed within one image element are given the same diameter they will maximally overlap for a given intensity value (presuming a circular cross-section for the laser beam). This is because the area of a printed dot, and with it the print density, increases with the square of the diameter. Therefore, a small increase of the diameter of one of the printed dots has to be compensated by a relatively large decrease of the diameters of the remaining dots, resulting in an increase of the perimeter of the cluster formed by all image dots within the image element (provided they overlap).

A further advantage of giving the image points the same intensity value is that the electronics needed to control the printing process can be smaller and switching frequencies lower than in the case of the dots each being allocated different intensity values.

According to one embodiment of the present invention, each image element is formed according to a raster pattern of m × n image points. Within each image element wherein a dot is to be printed the image points are arranged into a cluster of p × q image points. The printed dots thus form a rectangle, the perimeter of which is small, especially for small values of p and q.

In this embodiment the cluster of image points wherein a dot is to be printed is always placed in the same position within the image elements. The resulting print, therefore, shows a fine raster pattern, which is well suited for reproducing continuous tone images. This embodiment is less appropriate for reproducing the sharp edges of text and line images because the fine detail of the edges is replaced by the detail of the raster pattern. Therefore, according to a further embodiment of the present invention, the position of the cluster within an image element is determined from the intensity data contained by the image information.

According to a still further embodiment of the invention, a local contrast value is determined from the intensity data contained in the image information and the cluster of image points wherein a dot is to be printed is placed in a predetermined position within the image element, if the local contrast value is below a predetermined threshold value, and the cluster will be position that is related to the image information the local contrast value exceeds that predetermined threshold value.

In this way, the processing of the intensity data is locally adapted to the contrast of the image. Where, for example, there is a sharp transition between a white and a black image part, such as the edge of a text character, the cluster is positioned adjacent to the black image part, and in case there is low or no contrast at all, the cluster is placed at a predetermined position in order to form a raster pattern that is more suitable for reproducing continuous tone images.

According to another embodiment of the invention, in each case the cluster position within an image element wherein a dot is to be printed is randomly chosen. This embodiment makes the invention particularly well suited for reproducing raster images which would otherwise show distortions by the Moire effect resulting from interference of the raster frequency and the frequency of the image elements. The selection of a random position mode can be done by an operator or can be automatically done by an apparatus embodying the method analysis technique known per se. See, for instance, U.S. Pat. No. 4,144,547.

Other advantages of the invention will be apparent from a perusal of the detailed description of the presently preferred embodiments taken in connection with the accompanying drawings.

BRIEF DESCRIPTION OF THE INVENTION

PRESENTLY PREFERRED EMBODIMENTS

FIGS. 1a through 1e are examples of dot size modulation (referred to as "DSM"). DSM is one of the methods of reproducing half-tone images, by changing the size of an image dot on an image support by varying the energy supplied.

Figure 1A:
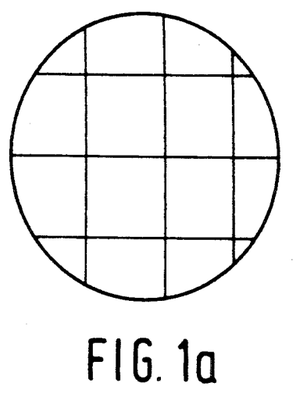
FIGS. 1a to 1e are examples of the modulation of the image dot size.
Figure 1B:
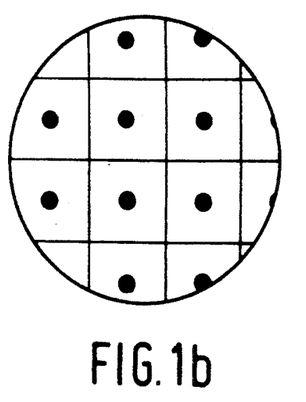
Figure 1C:
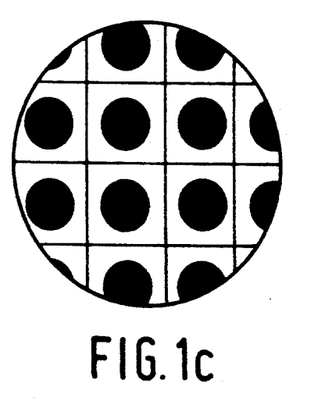
Figure 1D:
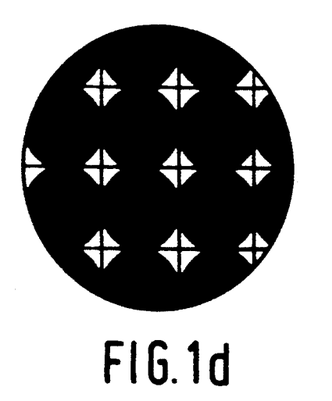
Figure 1E:
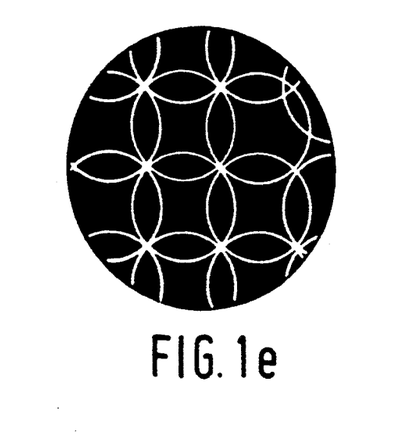

The lines in the FIGS. 1a through 1e indicate the limits of the imaging cells determined by the addressability of the reproduction system. If no energy is supplied to the cells and if the final image support is, for example, white paper, each cell keeps its white impression as shown in FIG. 1a. If a small quantity of concentrated energy is supplied per cell so that a small black image dot is formed (see FIG. 1b), the effect is a light-gray impression. As more energy is supplied per cell, each (black) image dot increases in size (see FIG. 1c) and the perceptible impression becomes grayer. When the energy supplied is such that the image dot touches the boundaries of the imaging cell, as shown in FIG. 1d, the corners of each cell are still white, so that the impression obtained is not black, but dark gray. A total black impression is obtained only when each image dot overlaps its imaging cell, i.e., when the diameter of the image dot is at least equal to he diagonal of the imaging cell (see FIG. 1e; for the sake of clarity the contours of the image dots are shown in white in FIG. 1e).

Thus, by simply changing the energy supplied per imaging cell DSM would be an ideal way of reproducing half-tones images. Imperfections in the image support and/or the reproduction system, however, make the simple DSM method, i.e., filling each imaging cell in a specific halftone area with the energy required for that half-tone, unreliable and not reproducible.

The method according to the present invention also uses DSM, but obviates the disadvantages associated with that method. A description of the apparatus in which the method is applied is provided below.

Figure 2:
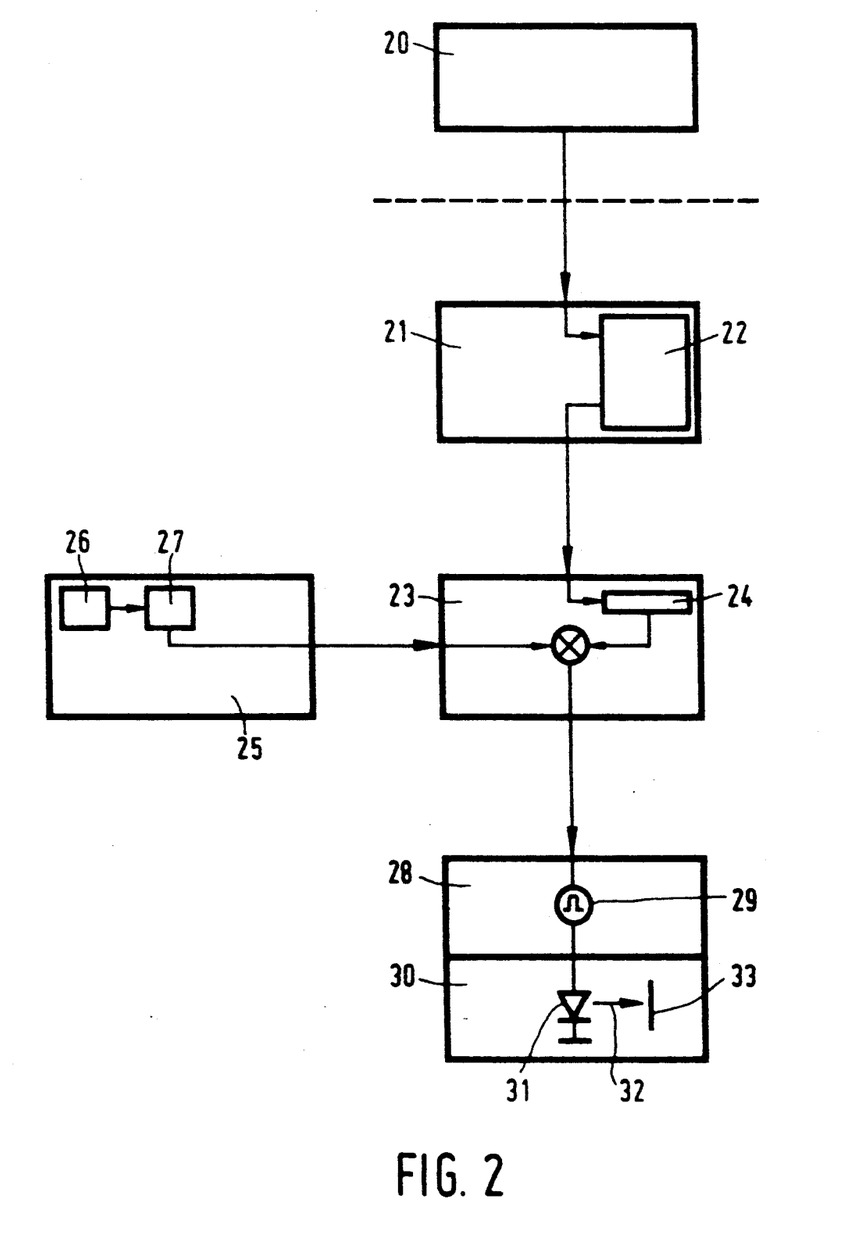
FIG. 2 shows an apparatus in which a method according to a first embodiment of the invention can be used.

FIG. 2 illustrates an apparatus in which the method according to the invention can be used. A first processing unit 21, which is hereinafter referred to as a "receiver", has a bit map memory 22, in which image information originating from a data generator 20 can be stored. This bit map memory 22 may, for example, have a capacity of 88×600 bytes. If an image scanner having a resolution of four dots per millimeter in both directions is taken as an example of a data generator 20, the image information relating to a half-tone image of 20×15 cm can be stored in bit map memory 22 (provided the image information per scanned image point is stored in one 1 byte).

Receiver 21 is connected to a second processing stage 23, which is hereinafter referred to as a "data coupler". A third processing stage 25 is connected to the data coupler 23 and is hereinafter referred to as the "raster generator". Raster generator 25 contains at least one comparison memory 27, and in which a comparison raster of m × n cells can be stored, in which raster the cells of a cluster of p × q cells are provided with the binary value 1 and the other cells are provided with the binary value 0.

The comparison raster can be stored in the comparison memory 27 in various ways. For example, during the manufacture of the apparatus in which the method is performed it is possible to incorporate a comparison memory 27 constructed as a ROM. The comparison memory is "baked in" in the ROM and the values for m, n, p and q and the position of the cluster within the raster is permanently fixed. The method only can be performed with the fixed values and position. This might be the case, for example, with a standard machine which must be capable of operation without problems even by unskilled users.

Another method is especially well suited for a specialist who may wish to work with a small comparison raster at one time and a larger comparison raster at another. In such case, it is possible to change the position and/or the size of the cluster. Such person can inputs the values of m, n, p and q and the position indication of the cluster via a keyboard (not shown) to a preliminary memory 26 such as a RAM. Raster generator 25 on the basis of these data then constructs a comparison raster with the cells filled with the binary values and stores the filled-in comparison raster in RAM comparison memory 27. The specialist can then perform the method in accordance with his specifications.

A third method involves inputting the values of m, n, p and q in accordance with one of the previous two ways, but the position of the cluster is in each case determined by the values of the intensity data which are contained by the image information and which surround the intensity data undergoing processing. Sharp transitions, e.g., in the case of lines or characters, are followed more satisfactorily in this way.

A fourth method involves inputting the values of m, n, p and q as previously described, but the position of the cluster is in each case is selected at random. For instance, a random generator producing random position data may be used. In this way, Moire effects are suppressed, since the cluster always occupies a different location within the comparison raster and hence within the image elements to be reproduced.

Data coupler 23 contains at least one line memory 24 which, for example, has the same storage capacity as a line from the bit map memory, i.e., 600 bytes. Processing image information with data from raster generator 25 takes place in data coupler 23. The latter is connected to a fourth processing stage 28, which is hereinafter referred to as the control unit, which controls a reproduction stage 30, e.g., a laser printer. The control unit 28 converts the received intensity data into control signals 29 for intensity-modulation of light beam 32 to be delivered by laser 31 of laser printer 30 to an image support 33.

For the following description of a first embodiment of the method, m and n are assigned the value 3 and p and q are assigned the value 2. The cluster is located in the bottom left-hand corner of the comparison raster. The cells of the cluster each have the binary value 1 and the other cells each have the binary value 0. The values of the examples given in the description hereinbefore are also used.

An image scanner 20 scans a half-tone image line by line, the half-tone image size being 5×10 cm for example, and generates 400 scan lines of 200 bytes each containing intensity data. Image scanner 20 transmits the generated bytes to the receiver 21 which stores the intensity bytes in a bit map memory 22. In this way the bit map memory 22 forms a digital reproduction of the half-tone image. Raster generator 25 forms a comparison raster of 3×3 cells in the comparison memory 27 and stores the binary value 1 in the left hand and middle cell of the middle and bottom rows. It stores the binary value 0 in the other cells.

Figure 3:
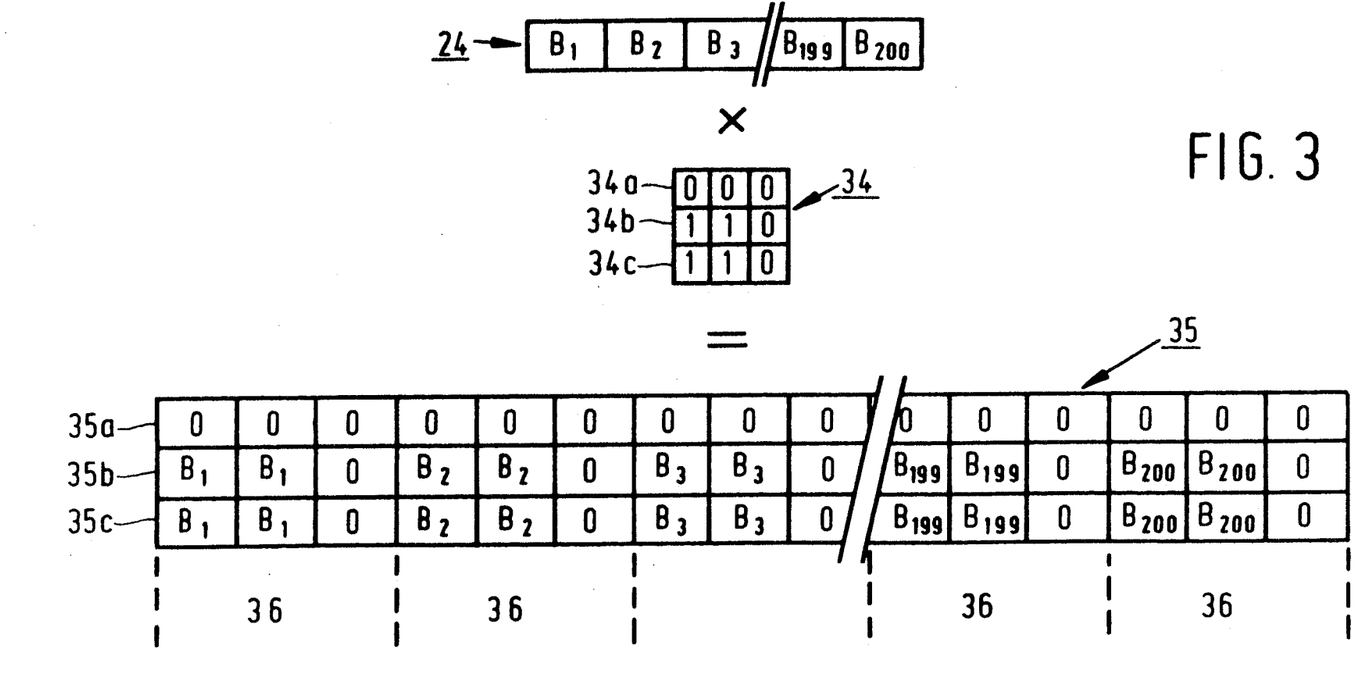
FIG. 3 is a diagram of the processing of the image information according to the first embodiment of the invention.

The receiver 21 transmits the 200 bytes from the top scan line of bit map memory 22 to data coupler 23 which stores these bytes $B_i$ (i=1 ... 200) in the line memory 24. Data coupler 23 then processes these bytes with the contents of the cells of comparison raster 34. FIG. 3 shows this processing diagrammatically. Data coupler 23 puts into a shift register the contents of the three cells of the top line 34a of the comparison raster 34 sent to it by raster generator 25 on request, and consecutively multiplies the three values in the shift register by the values of the bytes $B_i$ in line memory 24. Consequently three new bytes form per byte $B_i$ from line memory 24, and are reproduced in a print line 35a, which data coupler 23 successively passes to control unit 28 of laser printer 30. Control unit 28 converts the intensity data fixed in the new byte into a control signal 29 for intensity-modulation of the beam of light 32 to be delivered by laser 31 of laser printer 30 to a photoconductor 33, to form an image point of an image element 36 in accordance with an electrophotographic method known per se. Since the three bits of the shift register are at zero, in accordance with the contents of the three cells of the top line 3a of comparison raster 34, all the new bytes have a zero content, and an empty print line is reproduced.

After the bytes in the line memory 24 have been multiplied by the contents of the three cells of the top line 34a of comparison raster 34 and print line 35a has been formed, the data coupler 23 places the contents of the three cells of the middle line 34b of the comparison raster 34 into the shift register and performs the same operation on the bytes $B_i$ in line memory 24. Three bytes again form per byte $B_i$ from line memory 24 and are reproduced in a print line 35b. Since the shift register bits are successively on 1, 1 and 0, the first two new bytes now contain the intensity data of the old byte and the third contains a zero content. Data coupler 23 again passes the new bytes successively to the control unit 28, whereupon the laser 31 of the laser printer 30 in each case twice delivers a beam of light of a specific intensity and once no beam of light to the image support 33. Since the bottom line 34c of the comparison raster is identical to the middle line 34b, this procedure is repeated another time, so that the print line 35c forms. The bytes $B_i$ from line memory 24 are now all multiplied by the contents of the cells of the three lines of the comparison raster 34, and the first row 35 of image elements 36 of the half-tone image to be reproduced is formed on the image support.

For the processing of the 200 bytes of the next scan line from the bit map memory 22, the receiver 21 transmits them to data coupler 23 which stores these bytes in line memory 24, in which process it overwrites the bytes of the previous line of bit map memory 22. Data coupler 23 then uses the procedure described above on the bytes of the next scan line. Receiver 21 can also transmit the bytes of the next scan line of bit map memory 22 during the processing of the bytes of the previous scan line, provided data coupler 23 has a second line memory available in which it can store the bytes of the next scan line. At the end of the processing of the bytes of the previous scan line data coupler 23 can then continue directly (with a saving of time) with processing the bytes of the next scan line.

In this first embodiment each scanned image point from bit map memory 22 is converted into a matrix of 3×3 print image points.

Since each byte of line memory 24 is multiplied by the contents of the three cells of each of the three lines of the comparison raster and each new byte forms an image dot to be reproduced, each 3×3 image points forming an image element, the scanned image is blown up by a factor of 3 in both directions given the same resolution for the laser printer 30 as for scanner 20. To obtain a reproduced half-tone image equal in size to the scanned half-tone image, therefore, the addressability of the laser printer 30 in both directions must be three times that of the addressability of the image scanner. Generally it may be stated that the addressability of reproduction stage 30 in one direction must be m times as large as that of data generator 20 and in the other direction n times as large to give a 1:1 image.

Figure 4:
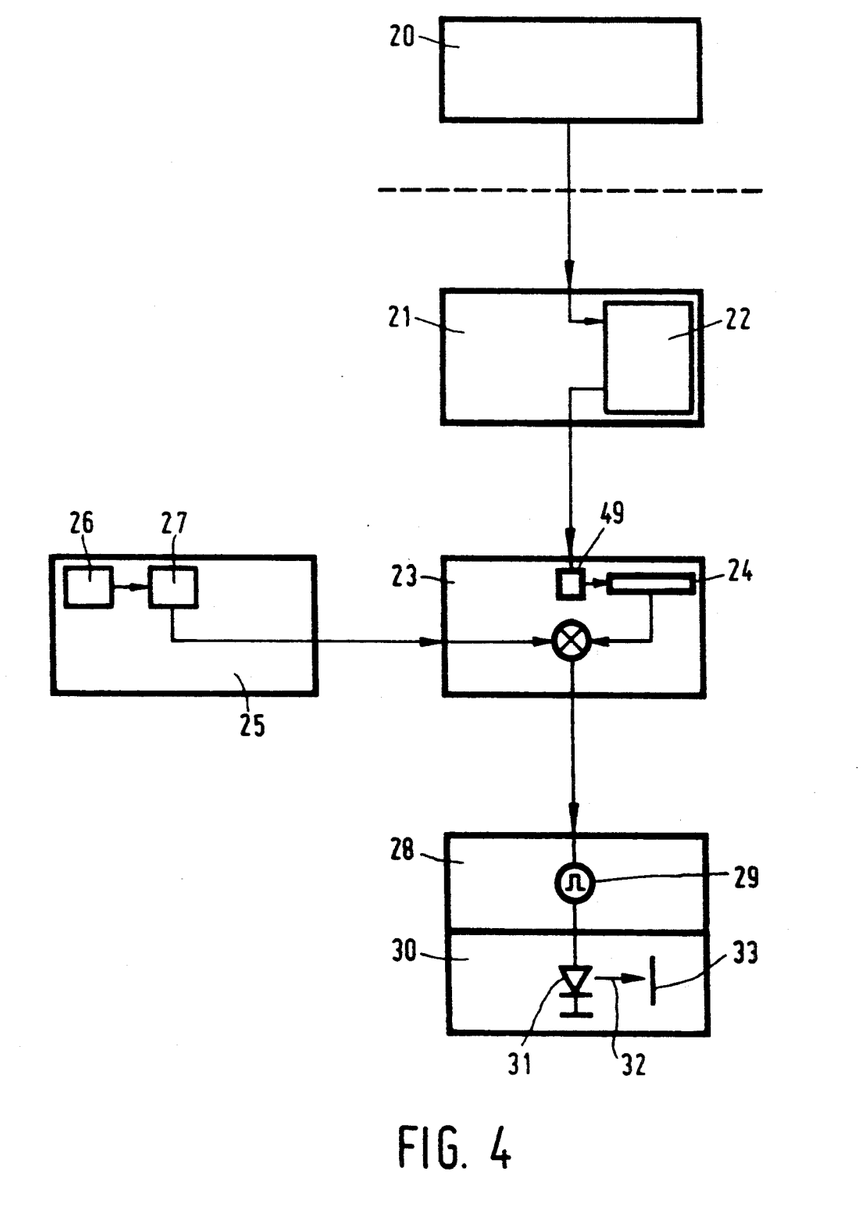
FIG. 4 shows apparatus in which a method according to a second embodiment of the invention can be used.
Figure 5:
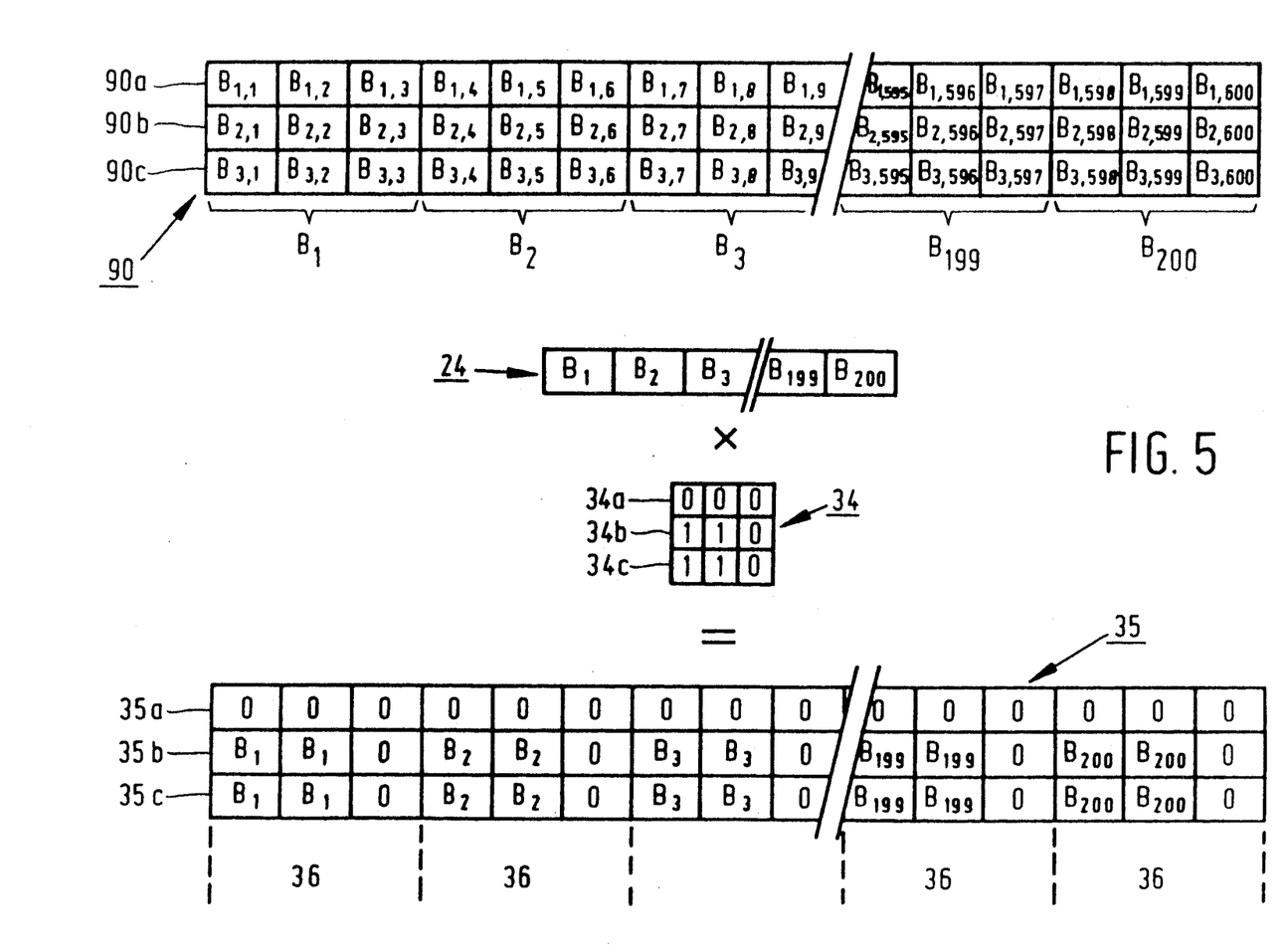
FIG. 5 is a diagram of the processing of the image information according to the second embodiment of the invention.

In a second embodiment each scanned image point from the bit lap memory is converted into one print image point. This is accomplished in the apparatus shown in FIG. 4, which apparatus is largely identical to that of FIG. 2, but has an additional averaging unit 49 in data coupler 23. Reference is further made to FIG. 5.

Since the raster frequency is not tripled during the data processing as in the first embodiment the original image is scanned at a 3 times higher spatial frequency in order to maintain the same print raster frequency. Therefore, the scanning of the half-tone original image of 5×10 cm produces 1200 lines of 600 bytes.

As in the first embodiment, intensity bytes of the scanned image points are stored in bit map memory 22 of receiver unit 21, and raster generator 25 forms a comparison raster of 3×3 cells in comparison memory 27, containing binary ones in a 2×2 cluster of raster cells and binary zeroes in the remaining cells.

Receiver 21 transmits the bytes $B_i$, of the first three lines 90a, 90b and 90c of bit map memory 22 to data coupler 23 where these bytes are averaged over blocks of 3×3 bytes by averaging unit 49 (FIG. 4) as shown in FIG. 5. The averaged values $B_k$ are stored in line memory 24, and are further processed in the same way as described with respect to the first embodiment, resulting in 3 lines 35a, 35b and 35c of print image points.

Figure 6A:
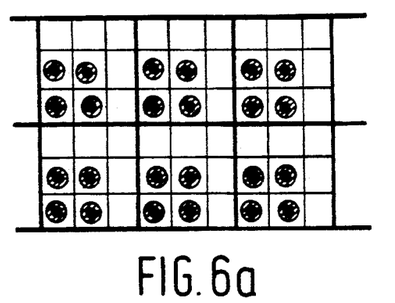
FIG. 6a to 6e are examples of the result of the method according to the invention.
Figure 6B:
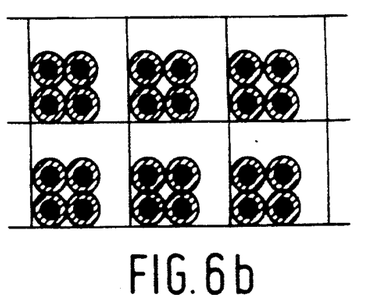
Figure 6C:
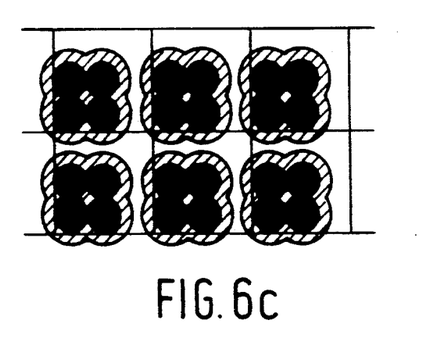
Figure 6D:
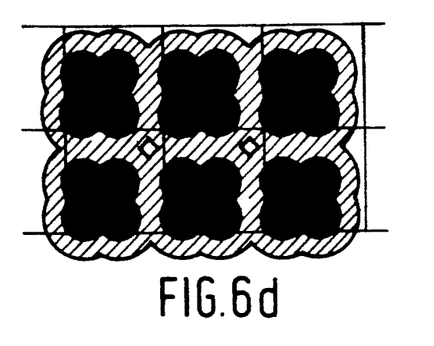
Figure 6E:
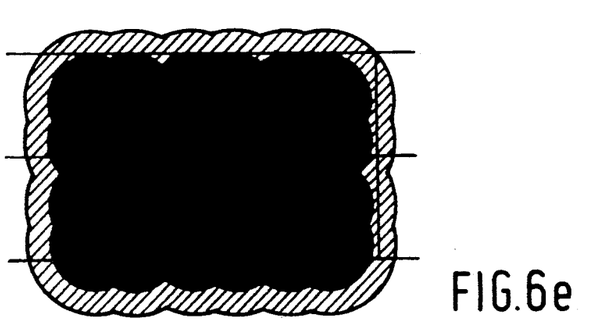

FIGS. 6a to 6e give examples of resulting image elements, three consecutive image elements of two rows of image elements are shown. Each image element comprises nine image points, each being one cell of a 3×3 matrix as is shown in FIG. 6a. Since only a cluster of four image points surrounded by empty image points is used to form the half-tone value of an image element by printing a dot in each of them, there is a large range in the light gray values. Even when the image dots have reached the limit of their image point (FIG. 6c), the empty part of the image element still predominates, so that the impression is still always on the light gray side. This as contrasted with the simple DSM method in which the impression is then dark-gray (see FIG. 1d for this). Only when the image dots overlap the image points and, in the case of the simple DSM method, a black impression is formed (FIG. 1e) does a medium-gray impression start to form (FIG. 6d). A completely black impression is obtained only when the diameter of the image dot is twice the size of the diagonal of the image point (FIG. 6e).

The effect of imperfections (instabilities in the image support and/or the reproduction system) is significantly suppressed by combining a raster pattern of 3×3 cells — as a result of which the spatial resolution (the effectively perceived resolution) remains high — and the uniform intensity values of the clusters of 2×2 cells — by means of which a large number of gray values can be reproduced. This will be explained with reference to FIGS. 6a to 6f.

Figure 6F:
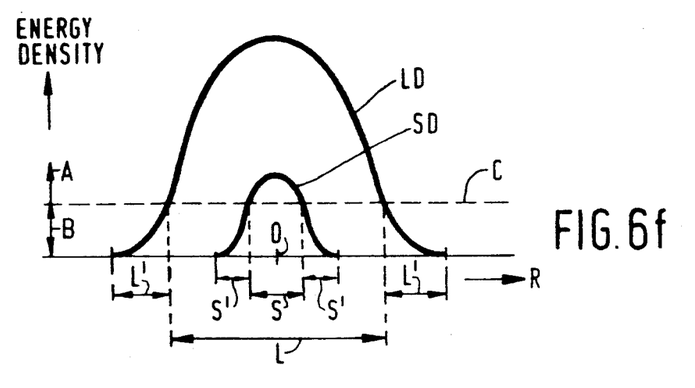
FIG. 6f is a graphical representation of the light energy delivered to the photoconductive intermediate image support by the laser beam of a laser printer.

In FIG. 6f a graphical representation is shown of the light energy delivered to the photoconductive intermediate image support by the laser beam of a laser printer as a function of the radial distance R from the center 0 of the irradiated area (which is supposed to be substantially circular). The graph SD refers to a low-energy irradiation, resulting in a small printed dot, and LD refers to a high-energy irradiation, resulting in a large printed dot. The broken line C refers to the so-called critical energy density, above which (area A) the irradiated area of the image substrate is developed totally black, and below which (area B) the irradiated area of the image substrate is developed a shade of gray depending on the actual amount of light energy delivered. From the graphs shown follows, that printed dots have a totally black kernel area S, L, surrounded by a border region S', L' with a gray value declining with increasing R. The optical density of the border region S', L' is influenced by the condition of the photoconductive intermediate image support and the developing system of the printer and therefore the image quality may vary over time and over the image area.

In FIGS. 6a to 6e the kernel area is represented by a solid black dot and the border region by a hatched area around each dot. When small dots are printed (FIGS. 6a and 6b), the total surface area on the border regions increases in the same way as it would do in a normal DSM method (compare FIGS. 1b and 1c), but with increasing dot width, the border regions are partially overlapped by neighboring dots (FIGS. 2c, 6d, 6e). As a result, the total area influenced by the system condition is relatively decreased. It should be noted that the cases wherein the border regions are not overlapped are limited to the very light gray shades, whereas in the case of normal DSM they occupy the greater part of the optical density scale.

In the two embodiments described, the cluster of print dots is always placed at the same position within the comparison raster. This results in the print having a regular raster pattern that is most suitable for reproducing half-tone images. For reproducing line or text images, however, a regular raster pattern is less appropriate as is well known in the art. This disadvantage can be eliminated by making the position of the print dot cluster within the comparison raster selectable according to the image information of the original image. In two further embodiments of the method and apparatus according to the invention the position of the p × q cluster of image points within the m × n comparison raster is automatically selected on the basis of the intensity data contained by the image information.

Figure 7:
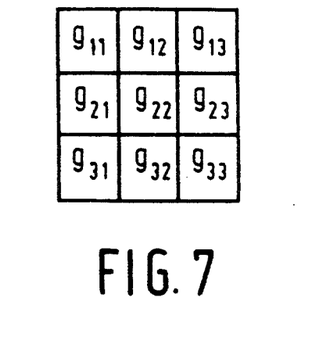
FIG. 7 shown an analysis window of 3×3 image points for use with a third and fourth embodiment of the invention.

The general concept of these embodiments is explained with reference to FIG. 7. In this example, an analysis window of 3×3 image points is used to decide where a cluster of 2×2 image points (wherein a dot is to be printed) is to be positioned. The cells of the analysis window contain the intensity values g(i,j) of corresponding image points (bytes) in the bit map memory 22.

Sum values S(k) are calculated according to
S(1) = g(1,1) + g(1,2) + g(2,1) + g(2,2)
S(2) = g(1,2) + g(1,3) + g(2,2) + g(2,3)

$S(3) = g(2,1) + g(2,2) + g(3,1) + g(3,2)$
$S(4) = g(2,2) + g(2,3) + g(3,2) + g(3,3)$

Among the values S(k) the highest, Smax, and the lowest, Smin, are selected and their difference ΔS = Smax − Smin, which is a measure for image contrast, is compared to a predetermined threshold value T.

If ΔS ≦ T, indicating that the analyzed area is a continuous tone image, then the 2×2 cluster is placed at a position within the 3×3 comparison raster, resulting in a regular dot pattern, which is preferable for representing continuous tones.

If, on the other hand, ΔS > T, for instance in line images, a position according to Smax is selected for the 2×2 cluster, in order to better reproduce image detail.

It is preferable that the value of T be somewhere in the middle of the range of possible values.

Figure 8A:
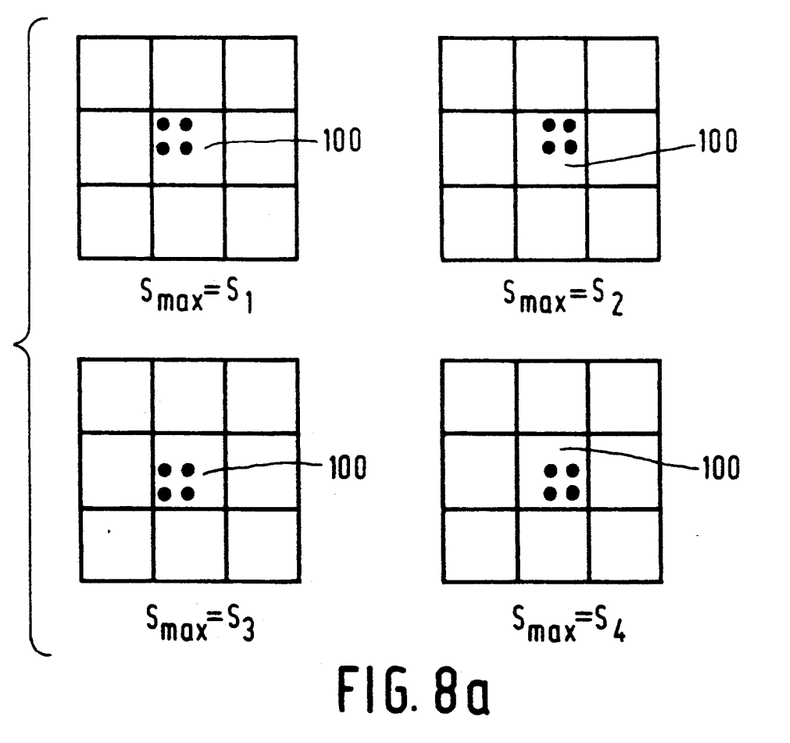
FIG. 8a shows an example of cluster placement, used in a third embodiment of the invention.

In FIG. 8a an example of cluster placing is given for a third embodiment of the method, wherein each scanned image point is converted into 3×3 print image points, and wherein m = n = 3 and p = q = 2, as is described in the first embodiment above. The raster squares correspond to the scanned image points of the bit map memory hat are analyzed in order to calculate the position of the print dots within the middle image element 100 and the black dots are the resulting print dots for the case indicated below the raster.

Figure 9:
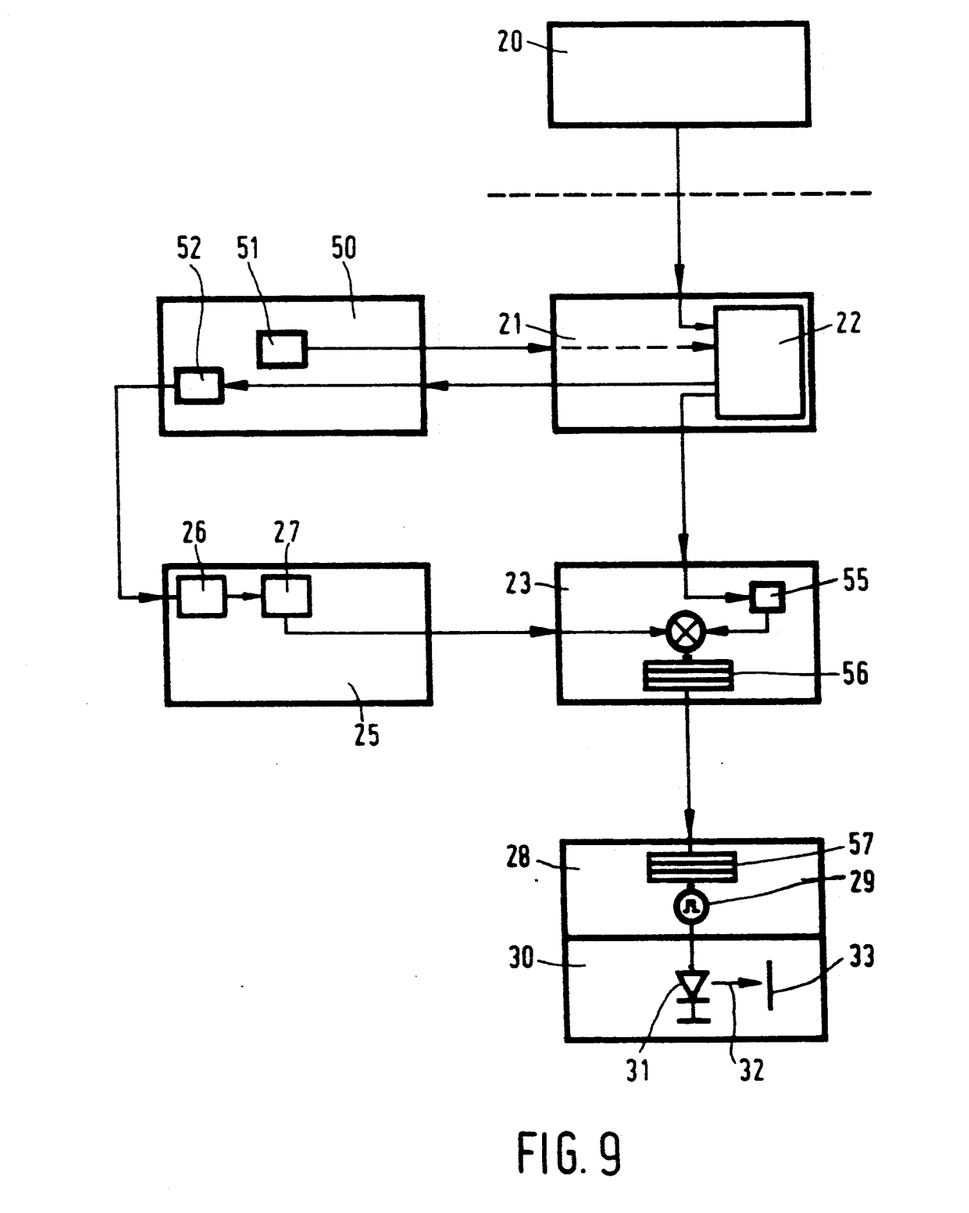
FIG. 9 shown an apparatus in which a method according to the third embodiment of the invention can be practiced.

FIG. 9 shows an apparatus for use with the third embodiment of the invention. This apparatus comprises a receiver unit 21, a data coupler 23, a raster generator 25, a control unit 28 and a reproduction stage 30 as does the apparatus of FIG. 2. Additionally a steering unit 50 is provided, connected to the receiver 21 and to the raster generator 25. Steering unit 50 contains an address generator 51 and a position selector 52. Data coupler 23 contains a latch 55 instead of the line memory 24 (FIG. 2) and a memory 56 for storing three lines of print data. Control unit 28 is provided with a buffer memory 57 for storing three lines of print data.

The operation of this apparatus is as follows. Address generator 51 of steering unit 50 transmits the address of an image point to be processed to receiver unit 21 and in response thereto, the receiver transmits the intensity value of that image point to data coupler 23 which stores it in latch 55. The receiver also transmits the intensity values of said image point and the eight image points surrounding it (forming a 3×3 matrix) to steering unit 50, where they are processed by position selector 52 in order to select a position for the print dot cluster within the comparison raster. Position selector 52 uses the algorithm described above and transmits the results to raster generator 25. Raster generator 25 stores these results in preliminary memory 26 and thereafter forms a comparison raster in comparison memory 27, which comparison raster contains binary ones in the cells corresponding to the position of the print dots and binary zeroes in the other cells. Data coupler 23 multiplies the values of the comparison raster sent to it by raster generator 25 on request by the value of the image point in latch 55, thus producing a raster of 3×3 cells containing intensity data (of which 2×2 are nonzero). This raster is stored in memory 56 on a location corresponding to the location of the processed image point in the scan line of which it forms a part.

Thereafter, the next image point of the scan line is processed and the results are stored in memory 56. In this way, memory 56 is filled with intensity data resulting from the processing of one scan line. When memory 56 is completely filled, its contents are transmitted to control unit 28 which stores them in buffer memory 57 and successively converts them into control signals 29 for laser printer 30. The laser printer 30 then produces a print as described above.

Figure 8B:
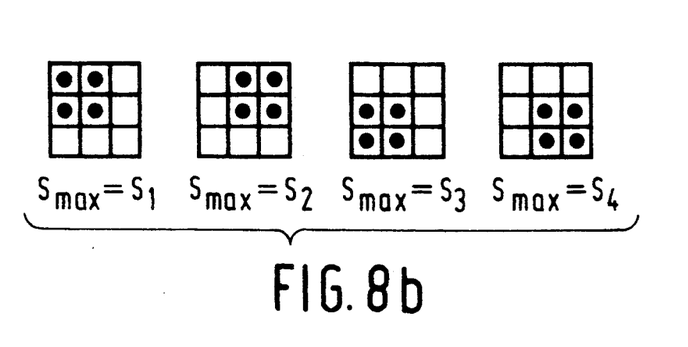
FIG. 8b shown an example of cluster placement, used in a fourth embodiment of the invention.

In FIG. 8b an example of cluster placing is provided of a fourth embodiment of the method according to the invention, wherein each scanned image point is converted into one print image point, and wherein m = n = 3 and p = q = 2, as is described in the second embodiment above. The raster squares shown correspond to the scanned image points as well as to the print image points, and the black dots indicate those print image points wherein a dot is printed for the case indicated.

Figure 10:
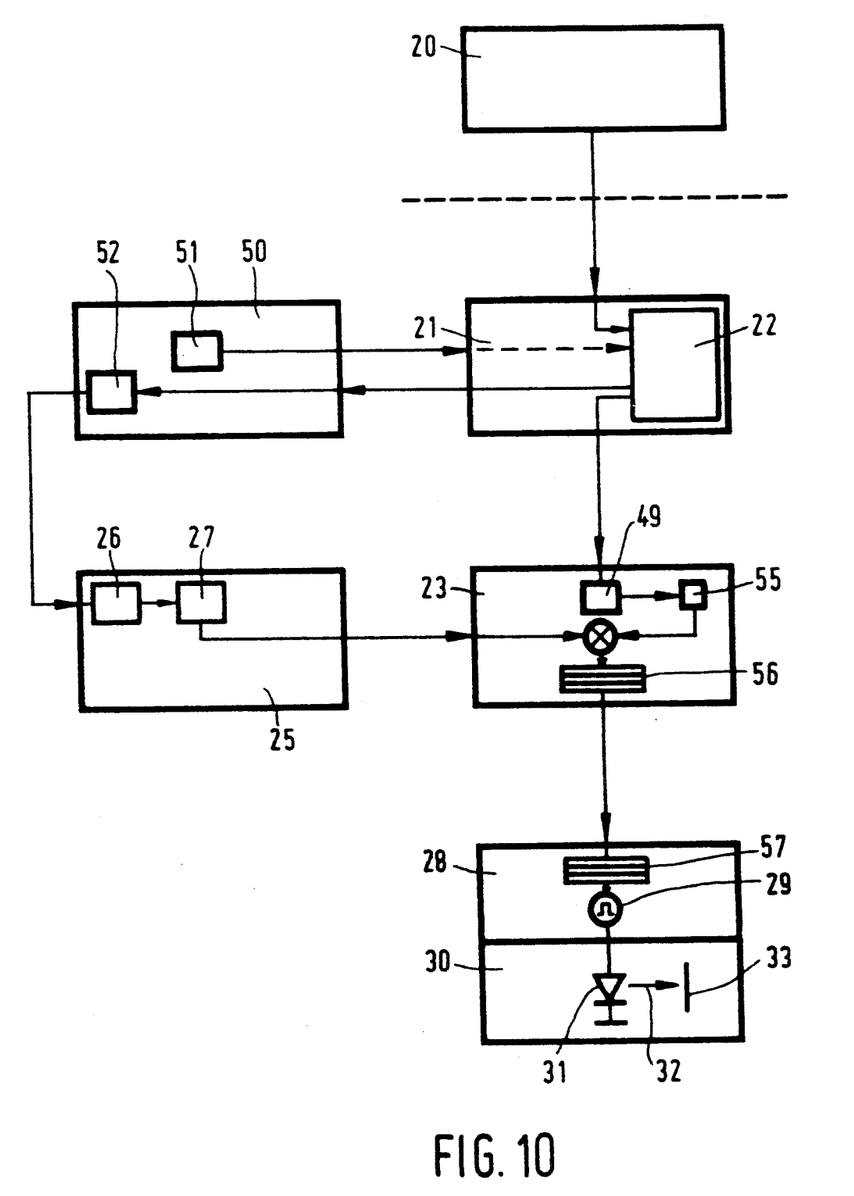
FIG. 10 shows an apparatus in which a method according to the fourth embodiment of the invention can be practiced.

FIG. 10 shows an apparatus for use with the fourth embodiment of the invention. This apparatus is largely identical to the one of the third embodiment (FIG. 9), the only difference being the addition of an averaging unit 49 in data coupler 23. As is described with respect to the second embodiment, the scan frequency is three times higher in both scan directions (and therefore the number of bytes in bit map memory 22 is nine times higher) than in the previously described embodiment in order to maintain the same print resolution.

The operation of this apparatus is as follows. Address generator 51 of steering unit 50 transmits the addresses of a block of 3×3 image points to be processed to receiver unit 21 and in response thereto, receiver unit 21 transmits the intensity values of those image points to data coupler 23 where their average value is calculated in averaging unit 49 and stored in latch 55. Also, the intensity values of the image points are transmitted to steering unit 50 where they are processed by position selector 52 in order to select a position for the print dot cluster within the comparison raster. The position selector uses the algorithm described above and transmits the results to raster generator 25. Raster generator 25 stores these results in preliminary memory 26 and thereafter forms a comparison raster in comparison memory 27, which comparison raster contains binary ones in the cells corresponding to the position of the print dots and binary zeroes in the other cells.

Data coupler 23 multiplies the values of the comparison raster sent to it by raster generator 25 on request by the average value in latch 55 and so produces a raster of 3×3 cells containing intensity data (of which 2×2 are nonzero). This raster is stored in memory 56 on locations corresponding to the locations of the processed image points in bit map memory 22.

Thereafter, the next block of 3×3 image points of the scan line are processed and the results are stored in memory 56. This way the memory 56 is filled with intensity data resulting from the processing of three successive scan lines. When memory 56 is completely filled, its contents are transmitted to control unit 28, which stores them in buffer memory 57 and successively converts them into control signals 29 for laser printer 30. Laser printer 30 then produces a print as described above.

It will be clear that the embodiments described have specific aspects which are entirely a matter of choice and that alternative implementations could readily be found by those skilled in the art. Accordingly, patent coverage sought is not limited by the embodiments disclosed, but should be commensurate with the scope of the invention, particular reference being made to the following claims.

What is claimed is:

1. A method of processing and reproducing on an image support image information relating to an image, comprising the steps of
   (a) forming image elements according to a raster pattern of image points;
   (b) selecting a predetermined number of the image points of each image element, wherein said predetermined number is smaller than the number of image points in an image element and equal for all image elements, said selected image points having such positions within the image element that they form a cluster having a minimal perimeter for that number of image points; and
   (c) printing dots in the selected image points on the image support with diameters in accordance with intensity data contained by the image information.

2. A method according to claim 1, wherein the dots printed within one and the same image element are printed with an equal diameter.

3. A method according to claims 1 or 2, wherein each image element is formed according to a raster pattern of m × n image points, and wherein within each image element the image points wherein a dot is to be printed are arranged in a cluster of p × q image points.

4. A method according to claim 3, wherein m = n = 3 and p = q = 2.

5. A method according to claims 1 or 2, including the step of forming a comparison raster containing a raster pattern of cells corresponding to the image points of an image element; assigning a first value to said cells corresponding to the image points wherein a dot is to be printed and a second value to the other said cells; multiplying said values of said comparison raster with intensity data contained in said image information corresponding to an image element; and assigning the resulting pattern of intensity data to that image element.

6. A method of processing and reproducing on an image support image information relating to an image, comprising the steps of
   (a) forming image elements according to a raster pattern of image points;
   (b) selecting a predetermined number of the image points of each image element, wherein said predetermined number is smaller than the number of image points in ann image element and equal for all image elements, said selected image points having such positions within the image element that they form a cluster having a minimal perimeter for that number of image points, which cluster is each time positioned within the image element in accordance with intensity data contained in said image information; and
   (c) printing dots in the selected image points on the image support with diameters in accordance with intensity data contained by the image information.

7. A method according to claim 6, wherein the dots printed within one and the same image element are printed with an equal diameter.

8. A method according to claims 6 or 7, wherein step (b) includes for each image element the steps of
   (i) determining a local contrast value from the intensity data contained in said image information; and
   (ii) placing said cluster of image points wherein a dot is to be printed in a predetermined position within the image element if the local contrast value is below a predetermined threshold value, and in a position that is related to the image information if the local contrast value exceeds that predetermined threshold value.

9. A method according to claim 6 or 7, wherein each image element is formed according to a raster pattern of m × n image points, and wherein within each image element the image points wherein a dot is to be printed are arranged into a cluster of p × q image points.

10. A method according to claim 9, characterized in that m = n = 3 and p = q = 2.

11. A method of processing and reproducing on an image support image information relating to an image, comprising the steps of
    (a) forming image elements according to a raster pattern of image points;
    (b) selecting a predetermined number of the image points of each image element, wherein said predetermined number is smaller than the number if image points in an image element and equal for all image elements, said selected image points having such positions within the image element that they form a cluster having a minimal perimeter for that number of image points, which cluster is each time randomly positioned within said image element; and
    (c) printing dots in the selected image points on the image support with diameters in accordance with intensity data contained by the image information.

12. A method according to claim 11, wherein the dots printed within one and the same image element are printed with an equal diameter.

13. Apparatus for processing and reproducing on an image support in raster from image information relating to a half-tone image, comprising
    (a) means for forming image elements according to a raster pattern of image points;
    (b) means for selecting a predetermined number of the image points of each image element, wherein said predetermined number is smaller than the number of image points in an image element and equal for all image elements, said selected image points having such position within the image element that they form a cluster having a minimal perimeter for that number of image points; and
    (c) means for printing dots in the selected image points on the image support with diameters in accordance with intensity data contained by the image information.

14. Apparatus according to claim 13, wherein the means for printing dots are arranged for printing dots with an equal diameter within one and the same image element.

15. Apparatus according to claims 13 or 14, wherein image elements comprise m × n image points, and wherein the means for printing dots comprise means for arranging the image points wherein a dot is to be printed into a cluster of p × q image points.

16. Apparatus according to claim 13, wherein the means for printing dots include means for selecting a position within each image element for said cluster of image points wherein a dot is to be printed, based on the image information.

17. Apparatus according to claim 16, wherein the means for printing dots are arranged for printing said dots within an equal diameter within one and the same image element.

18. Apparatus according to claim 16, wherein the means for printing dots include means for determining a local contrast value from the intensity data contained in the image information and for placing said cluster of image points wherein a dot is to be printed in a predetermined position within the image element if the local contrast value is below a predetermined threshold value, and in a position that is related to the image information if the local contrast value exceeds that predetermined threshold value.

19. Apparatus according to claim 18, wherein the means for printing dots are arranged for printing these dots with an equal diameter within one and the same image element.

20. Apparatus according to claim 16, wherein the means for printing dots comprise means for each time selecting a random position within the image element for the cluster of image points wherein a dot is to be printed.

21. Apparatus according to claim 20, wherein the means for printing dots are arranged for printing these dots with an equal diameter within one and the same image element.

* * * * *